United States Patent [19]

Howard

[11] 4,416,212

[45] Nov. 22, 1983

[54] RESCUE SIGNAL

[76] Inventor: Thomas L. Howard, 1972 Scudder Dr., Akron, Ohio 44320

[21] Appl. No.: 258,664

[22] Filed: Apr. 29, 1981

[51] Int. Cl.$^{3}$ .......................... G01B 1/02; B64B 1/50

[52] U.S. Cl. .................................... 116/210; 116/173; 441/80

[58] Field of Search .................. 116/209, 306; 441/80, 441/88, 8, 6

[56] References Cited

U.S. PATENT DOCUMENTS

| | | | |
|---|---|---|---|
| 1,935,229 | 11/1933 | Neal | 441/8 |
| 2,418,392 | 4/1947 | Bender | 116/211 X |
| 2,646,019 | 7/1953 | Chetlan | 116/210 |
| 4,045,835 | 9/1977 | Flam et al. | 441/106 |
| 4,305,143 | 12/1981 | Simms et al. | 441/80 |

FOREIGN PATENT DOCUMENTS

| | | | |
|---|---|---|---|
| 32571 | 2/1928 | France | 116/210 |
| 2469934 | 11/1979 | France | 116/210 |

*Primary Examiner*—Daniel M. Yasich
*Attorney, Agent, or Firm*—Reese Taylor

[57] ABSTRACT

A rescue signal for use by a person in the water, consists of a tube of thin flexible material, at least about as long as the user's arm and as wide as his hand, inflatable by mouth, of a vivid color such as the international emergency orange. A flag of a similar but contrasting color may be fastened to the distal end. A lanyard for fastening to the user's garment is preferably included. The signal is folded into a compact package and is carried in a downward opening pocket on the user's outer garment, which is preferably a life jacket.

9 Claims, 7 Drawing Figures

RESCUE SIGNAL

When someone falls overboard from a boat on a large body of water, or when a boat sinks and the occupants are cast adrift, such persons in the water are almost invisible to rescuers, because even the small waves on an almost calm day are likely to be higher than a man's head so that the waves obscure his visibility.

This invention accordingly is a signal which can fit easily in the pocket of a shirt or jacket, yet can be extended to a height of several feet as a wide but very light staff so that it is easily lifted to be visible to rescuers.

The rescue signal of this invention is a simple inflatable tube of thin flexible material of an easily visible color such as the internationally recognized emergency orange, which is highly visible because of its bright color and great contrast to the blue or green or gray color of the surface of bodies of water, as well as contrast to the green color of vegetation on the shores of most lakes and streams.

For convenience of supply and availability, as well as ease of use when needed, the rescue signal of this invention is made of very thin but strong and flexible material such as polyethylene terephthalate film (sold under the Mylar brand among others) in tubular form, so that it can be flattened and folded in a compact packet easily carried in a pocket of a garment, and when needed it can easily be unfolded and stiffened by inflation by mouth.

This rescue signal should be several feet long (at least about three feet or one meter but preferably about four or five feet, or 1.5 meters or more in length), so that it can be held erect without too great effort in a moderate breeze, and can therefore be visible above the waves at least a part of the time.

The width of the signal staff is preferably from about four to twelve inches, (or about ten to thirty centimeters) so that it will be wide enough for visibility from a reasonable distance but not so wide as to make it difficult to hold erect in a fair breeze.

Since the rescue signal is normally to be carried in a pocket of a garment, it must be made of very thin and therefore light material which is also very strong and flexible, and can be folded into a compact package.

When needed to be used, the rescue signal is unfolded and inflated by mouth, which stiffens it sufficiently for handling like a rod or staff. It must therefore be closed at one end and be provided with a one-way valve for inflation at the other end.

THE DRAWINGS

DETAILED DESCRIPTION

Figure 1:
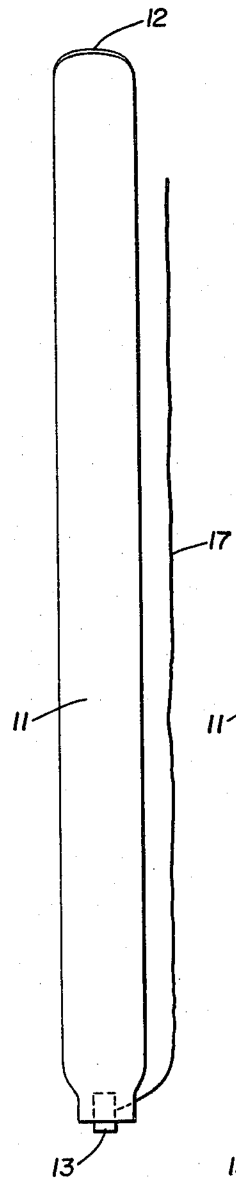
FIG. 1 is a small-scale view of the rescue signal as it appears when uninflated and flat.
Figure 2:
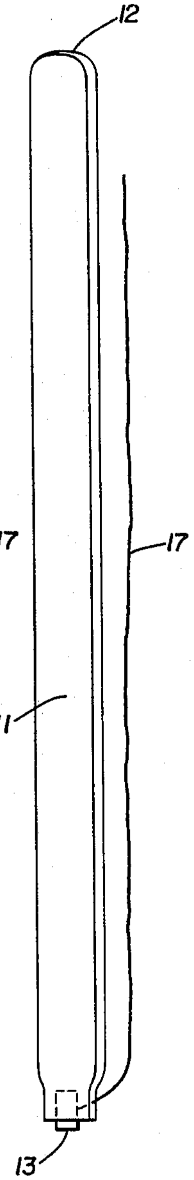
FIG. 2 is a similar small-scale view showing the appearance of the signal device when rounded by inflation.
Figure 5:
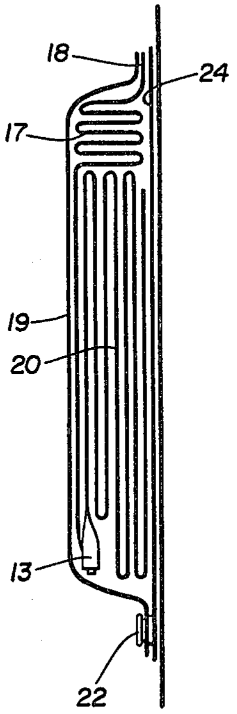
FIG. 5 shows how the signal is folded into a compact package.

The rescue signal is preferably made of a very thin tubing 11 or 20 of polyethylene terephthalate or similar strong, flexible, and durable plastic which can be flattened and folded for storage as shown in FIG. 5.

This tubing should be vividly colored for maximum visibility, preferably the internationally prescribed emergency orange color, and best, a vivid fluorescent orange or red.

One end of the length of tubing 11 may be closed by a heat seal 12, and the other end is provided with a mouthpiece 13.

The mouthpiece 13 can be of any simple construction which includes a one-way valve and has sufficient rigidity to resist collapse under emergency conditions, so that blowing air into it will be possible under all conditions.

Figure 3:
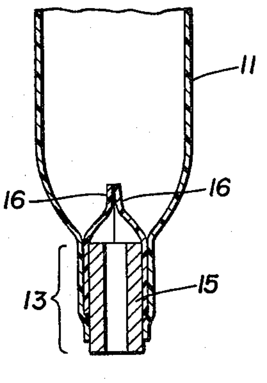
FIG. 3 is a larger scale longitudinal section of one end showing a mouthpiece and a simple one-way valve for inflation.
Figure 4:
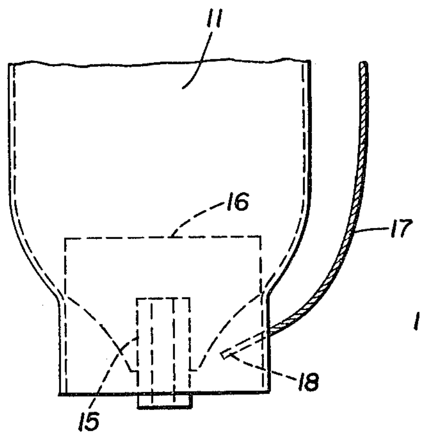
FIG. 4 is a similar phantom view at a right angle to FIG. 3.

As shown in FIGS. 3 and 4, the mouthpiece 13 preferably includes a short length of small diameter stiff tubing 15 to which the lower end of the large diameter flexible tubing 11 is permanently fastened by any convenient means such as cementing, or heat sealing, or binding with a filament.

It is important that this mouthpiece be as simple as possible, so that the user will not have to find how to use it, but need do nothing but blow, so that the signal can be quickly inflated and will stay inflated, to stiffen it enough so that it can be held erect.

Consequently, the rescue signal should have a permanently open stiff mouthpiece, and a simple one-way valve connected to the mouthpiece. The valve may consist simply of a pair of strips of film 16 which are placed inside of one end of the length of external tubing 11, adjacent to the stiff internal mouthpiece tube 15 and are then cemented or bound in place, so that air blown inward between the valve strips 16 cannot flow out in the opposite direction.

Preferably, a lanyard 17 about two or three feet long (up to about one meter) is attached, as by placing one end between the layers of the mouthpiece end of tube 11 when the layers are joined to mouthpiece tube 15. The other end of the lanyard 17 can be used to tether the device to the inside of the pocket in which the rescue signal is stored, so that the rescue signal cannot slip from the numb fingers of the user and be lost.

Figure 7:
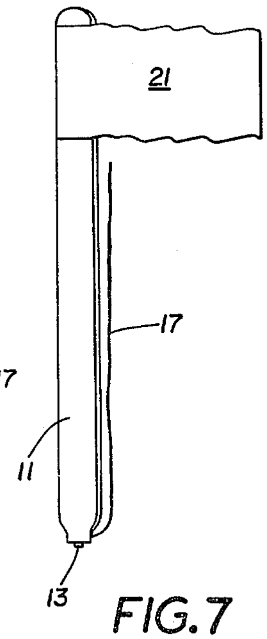
FIG. 7 shows a modification including a flag.

Moreover, a flag 21 of the same international emergency orange color, or preferably a somewhat contrasting color such as a yellow flag on an orange staff or vice versa, is preferably cemented to the upper end of the signal tube 11 to increase the visible area of the device, as shown in FIG. 7, and thereby increase the visibility of the signal and consequently enhance the likelihood of the emergency signal being seen.

Figure 6:
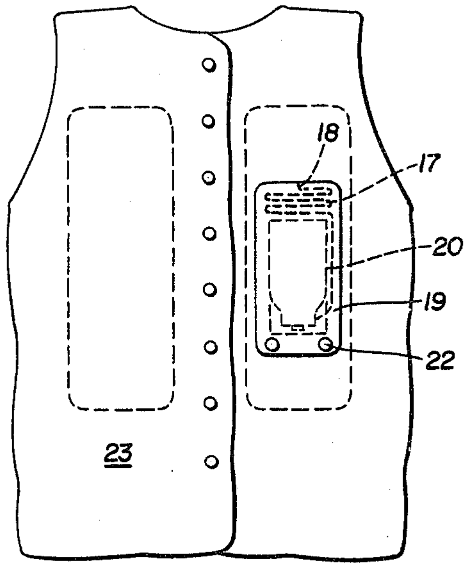
FIG. 6 shows how the signal can be carried in a pocket.

The rescue signal is preferably made a permanent part of a standard life jacket. This is easily accomplished by making a pocket as shown in FIGS. 5 and 6, consisting of a shaped cover 19 of a size and shape to accommodate the deflated and folded device as shown in FIG. 5, in which the lanyard 17 has its free end fastened to the inside of pocket 19, as by stitching or cementing. The remainder of the lanyard 17 is then folded and placed in the closed end of pocket 19, followed by tube 20, likewise folded into a shape which will slide easily into pocket 19.

The pocket may be made as a complete unit for packaging of the inflatable tube 11 between a flat base and a cover so that the package can be handled as a separate unit, to be stitched or cemented to an existing life jacket; or if the pocket is to be provided when the life jacket is manufactured, only a shaped patch of suitable size needs to be added to constitute the pocket. In either event, the pocket should be placed with its opening downward, and be closed by a firm fastener which is easily opened, such as a pair of snap fasteners 22, or a zip lock fastener consisting of interlocking plastic strips.

The downward opening is important to permit gravity to assist in removal of the signal from the pocket, eliminating any problem of grasping and lifting under emergency conditions.

If the rescue signal is to be added to an existing life jacket or other existing garment, the pocket 19 should be provided as a complete self-contained unit as shown in FIG. 5. It consists of a flat backing panel 24 having the shaped pocket front 19 fastened to it on both vertical edges and the top end, with a closure such as snap fasteners 22, or interlocking plastic strips, closing the bottom opening.

Such a pocket can be either stitched or cemented in place.

If the pocket is to be cemented, a suitable solid but tacky pressure-sensitive adhesive can be coated on the exposed surface of the backing panel 24 and be covered by a peelable film so that the complete signal device and its container, pocket 19, can be applied to any desirable garment such as a life jacket by peeling and discarding the protective film and simply pressing the sticky surface of the back of the pocket assembly against the desired location on the life jacket or other outer garment. Alternatively, any other strong and durable means for mounting on a garment may be used.

The lanyard 17 and inflatable tube 11 should each be zig-zag folded for placement in the pocket 19. This is important for avoidance of tangling and for spontaneous unfolding of the tube and the lanyard into an open and easily manageable condition when they are needed.

This device will minimize the problem of locating a person adrift in the water, with only his head above the water, who cannot be seen because of the waves, because it will supply a clearly visible emergency signal of a vivid color, which can be held several feet above the water.

I claim:

1. An elongated inflatable rescue signal comprising:

an elongated, hand-held inflatable tubular member having a signal flag affixed to the upper portion thereof and a mouthpiece having a tube and one-way valve for inflation of said tubular member affixed to the lower portion thereof, said elongated inflatable tubular member being constructed of a relatively thin, flexible, but nearly inextensible material, so as to enable the folding of said signal into a compact package for storage and the subsequent erection thereof by blowing of adequate air into said tubular member through the mouthpiece until said member is fully inflated, thereby providing a semi-rigid staff for support of the signal flag.

2. A rescue signal as in claim 1, including a lanyard affixing it to an outer garment.

3. A rescue signal as in claim 2, in which the inflatable tube is colored the international emergency orange color.

4. A rescue signal as in claim 1, folded in zigzag folds in a pocket on an outer garment.

5. A rescue signal as in claim 4, in which the pocket is closed by fastener means.

6. A rescue signal as in claim 1, packaged in a patch pocket having a pressure-sensitive adhesive backing for affixation to a garment.

7. A self-contained rescue signal comprising:

a pocket, releasable closure means for normally closing said pocket, an elongated, hand-held inflatable tubular member having a signal flag affixed to the upper portion thereof and a mouthpiece having a tube and one-way valve for inflation thereof affixed to the lower portion thereof, said inflatable tubular member being constructed of a relatively thin, flexible, but nearly inextensible material, so as to enable the folding of said inflatable signal device into a compact package for storage in said pocket and a lanyard which is affixed to said pocket and to said inflatable signal device in order to insure against loss of said signal device upon its removal from said pocket.

8. A life jacket assembly comprising in combination, a life jacket having securedly affixed thereto, a self-contained rescue signal said self-contained rescue signal device comprising of a pocket, readily releasable closure means normally closing said pocket, an elongated inflatable tubular member having a signal flag affixed to the upper portion thereof and a mouthpiece having a tube and one-way valve for inflation thereof affixed to the lower portion thereof, said inflatable tubular member being constructed of a relatively thin, flexible, but nearly inextensible material, so as to enable the folding of said inflatable signal device into a compact package for storage in said pocket and a lanyard which is affixed to said pocket and to said inflatable signal device in order to insure against loss of said signal device upon its removal from said pocket.

9. A life jacket assembly comprising in combination, a life jacket having securedly affixed thereto, a self-contained rescue signal device said self-contained rescue signal comprising of a pocket, closure means for opening and resealing said pocket, an elongated, hand-held inflatable tubular member having a signal flag affixed to the upper portion thereof and a mouthpiece for inflation thereof affixed to the lower portion thereof, said inflatable tubular member being constructed of a relatively thin, flexible, but nearly inextensible material, so as to enable the folding of said inflatable signal device into a compact package for storage in said pocket, a lanyard which is affixed to said pocket and to said inflatable signal device in order to insure against loss of said signal device upon removal from said pocket, said pocket comprising a patch pocket having a pressure-sensitive adhesive backing for affixation to the life jacket, and said lanyard being attachable to an outer garment.

* * * * *